3,457,172
FLAME EXTINGUISHING COMPOSITION
Katherine Ferguson Stewart, New Orleans, La., and James A. Pruett, Houston, Tex., assignors to Flame-Out, Inc., Kenner, La., a corporation of Louisiana
No Drawing. Continuation-in-part of application Ser. No. 339,864, Jan. 24, 1964, which is a continuation-in-part of application Ser. No. 200,340, June 6, 1962. This application Aug. 10, 1966, Ser. No. 571,394
Int. Cl. A62d 1/00
U.S. Cl. 252—3      3 Claims This is a continuation-in-part of our application Ser. No. 339,864 filed Jan. 24, 1964, now abandoned which is a continuation-in-part of our application Ser. No. 200,340 filed June 6, 1962, now abandoned which is in turn a continuation-in-part of our application Ser. No. 108,751, filed May 9, 1961, now abandoned.

The present invention relates to fire extinguishing and more particularly to an improved liquid wetting agent concentrate of the type intended to be mixed with water to form a wet water and foamable liquid for application to fires.

A number of liquid compositions are known for use in extinguishing fires, and their selection depends largely on the class of fire. There are three classes. Class A fires are those in ordinary combustible materials, Class B fires are in flammable liquids such as gasoline, naphtha and the like and Class C fires are in live electrical equipment.

In extinguishing these fires, one or more methods are used:

(1) Breaking up of chain reactions in the flame thus causing a reduction of flame-retardant and glow-retardant properties of the combustible materials.

(2) Reduction of heat to below the ignition temperature or flash point—"cooling."

(3) Emulsification of air and liquid phases or liquid-liquid phases, i.e., forming stable "foam" or liquid-in-liquid emulsion in or at the interface between the atmosphere and the combustible materials.

(4) Dilution of or total removal of fuel vapors to below their explosive limits—"removal of fuel."

(5) Dilution of or total removal of oxygen—such as by interposing a "foam" blanket or $CO_2$ blanket between the combustible material and the air—"smothering."

For the purposes of Class A fires "cooling" is usually relied upon and water is generally employed. However, water has certain limitations and it has recently been improved by the addition of a wetting agent to form a so-called wet water. This penetrates combustible materials more rapidly than water.

In the case of Class B fires, water is generally not acceptable, because, e.g., burning oils will float on top of the water and continue burning. A number of foam type or solution materials have been developed for such fires and the former generally function by reaction of sodium bicarbonate and aluminum sulfate—to generate gas—in the presence of water and a foam stabilizer such as saponin, soap, glue or a protein degradation product, or air is blown into water and the foam stabilizer to form a mechanical foam. Certain wet waters may be foamed with this special equipment. These foams float on burning oils and smother them.

As a general rule, the action of such liquids is limited to one of the above functions, "smothering." For example, foams usually do not "remove the fuel." The wet waters are promising as improved fire fighting liquids, but unfortunately considerable difficulty has been experienced in selecting the wetting agents. There are numerous chemicals which are wetting agents—i.e., they reduce the surface tension of water—but very few of these chemicals are useful for fire extinguishing because of special requirements which must be met. A wetting agent must meet standards of toxicity, corrosivity, and stability at very high and low temperature, and, of course, must be effective in extinguishing fires. At the same time, for use in wet waters, they must efficiently increase the rate of penetration into combustibles such as wood, and fabrics. When used for foams, the foam must be stable, even at high temperatures. These properties can be determined by certain standard tests of physical and chemical properties established, e.g., by the National Board of Fire Underwriters and most conventional wetting agents are unsatisfactory.

An important difficulty is the tendency of many wetting agents to separate from solutions in water, especially at extreme high and low temperatures. Wet waters are preferably prepared as concentrates in water which are diluted with more water when they are to be used; this is necessary to avoid the cost of shipping large volumes of water which could be added by the user. Howevery, many wetting agents do not readily form stable aqueous solution, either concentrated or dilute, but rather separate at high temperatures. For this reason, one of the standard tests for wetting agent solutions determines stability under storage at 180° F. If a separate layer of wetting agent forms the solution is unsatisfactory. This is a particularly important requirement when the wetting agent is used with a metering valve which injects it into a stream of water. A tube is placed into a container of the concentrate and liquid is drawn through it by suction: If the concentrate has separated into a layer of water and a layer of surfactant, it is possible that only water will be drawn through the tube. This, of course, could be disastrous.

The difficulty of meeting these requirements is so great that by 1961, Underwriters' Laboratories only certified five wet waters, and of these, only two were accepted for both Class A and Class B fires. The remaining three were accepted only for Class A fires.

In accordance with the present invention, a wet water type concentrate which avoids the difficulties of present wet waters is prepared from water, a non-ionic surface agent which is a reaction product of tridecyl alcohol and ethylene oxide, an ionic surface-active agent, namely, sodium N-methyl-N-oleoyl taurate, a primary or secondary aliphatic alcohol, a polyfunctional alcohol, and an inorganic chromate. Preferably, for the purpose of stabilizing the liquid, the concentrate also includes a monoether of a polyfunctional alcohol. This concentrate is diluted with water in varying concentrations to form a fire extinguishing wet water and foamable liquid for use on Class A or Class B fires. Fires are quenched more rapidly, the penerating action of the fire extinguishing liquids is enhanced, chain reactions in the fire are reduced and the foam is stable and lasting. The freezing point of the concentrate is extremely low, and for the preferred liquids is −65° F. The concentrate can be stored at −65° F. without freezing. It also can stand temperatures in a range 32° F. to 180° F. without creaming or layering out, and the same stability is obtained in solutions containing 1–6% by weight of the concentrate.

Another difficulty of present wet waters and mechanical foams, which is overcome, is their damaging effect on equipment, packing in pumps, etc., due to the corrosivity and because the type of penetrating agents used causes conventional wet waters to be too acid or too alkaline. The concentrate of this application possesses low alkalinity. Proportions of ingredients are adjusted to have a final pH of about 7.5–8. As the concentrate is added to water which is used, and the pH of water varies from one part of the country to another, the pH of the concentrate should be near neutral. Most waters are on the acid side, so that it is preferable to have a concentrate which is slightly alkaline. The low alkalinity tends to compensate for high alkalinity in waters of that type. In some cases it is desirable to add other agents to partially neutralize the water if it is extremely alkaline or acid. For example, sodium chromate or sodium nitrate may be used. This is advantageous in being less harmful to fire fighting equipment—packing, hoses, bronze, copper, steel, etc.

Each of the above ingredients has an effect on the usefulness of the liquid in combatting fires, and the combination has a synergistic effect. Omission of any one of the ingredients will result in loss of effectiveness.

The non-ionic surface active agent used is a condensate of ethylene oxide and tridecyl alcohol preferably having a molecular weight in the range about 332 to 860. These condensates are available commercially with molecular weights of 332, 464, 596, 728 and 860. The condensate which has been found especially effective is known and commercially available as Surfonic TD–90, which has the following characteristics:

| | |
|---|---|
| Flash Point ° F. | 385 |
| Molecular weight | 596 |
| Viscosity, 210° F. Centistokes | 8.0 |
| Density at 100° F. g./ml. | 0.9947 |
| Cloud Point, ° C., in water | 61.9 |
| Surface tension | 26.7 |
| Interfacial tension, 25° C. dynes 1 cm. 0.1% | 4.2 |
| Foam height mm. 40° C. (.10% aq. soln) | |
| Initial | 118 |
| 5 minute | 10 |
| Wetting Time, Tape Test, 25° C., sec. 0.1% | 2.5 |
| Draves test, 3 g. hook, sec., 0.1% | 5.8 |

Surprisingly, this wetting agent is far more efficient in penetrating than other non-ionic wetting agents, and, hence, it is far more effective in extinguishing fires.

The primary or secondary alcohols are water soluble lower saturated aliphatic alcohols, having up to about 4 carbon atoms, such as methyl alcohol, ethyl alcohol or isopropyl alcohol. Of these, methyl alcohol is preferred because of its low cost and its contribution to foam stability. Ethyl alcohol can be used but is somewhat less satisfactory in regard to foam stability. Isopropyl alcohol is at least the equal of methanol in this respect. These primary or secondary alcohols decrease viscosity and increase surface tension somewhat, which increases the quality and stability of the formula.

Of the polyfunctional alcohols which can be used, ethylene glycol is preferred, although other alcohols such as propylene glycol, butylene glycol, trimethylene glycol, tetramethylene glycol and diethylene glycol are suitable. Ethylene glycol lowers the freezing point of the composition, and also increases the boiling point of the water phase, thus increasing the effectiveness of the composition as a coolant. This high temperature cooling effect, in turn, leads to increased formula stability at high temperatures. Ethylene glycol also increases the density and uniformity of the foam.

The inorganic chromate is added for the purpose of improving corrosion resistance and sodium chromate is preferred. Other alkali metal chromates and dichromates, such as potassium dichromate may be substituted, but, surprisingly, sodium chromate is more satisfactory in terms of foam stability and density.

As the anionic surfactant, sodium N-methyl-N-oleoyl taurate is used, which is available commercially, e.g., as Igepon T–51; this stabilizes the concentrates and dilute solutions and increases solubility of the non-ionic surfactant. Consequently, layering out of the wetting agent is minimized. Igepon T–51 contains about 14%, or a little more by weight of sodium-N-methyl-N-oleoyl taurate, 78% water and 3–5% sodium chloride, in addition to minor amounts of other materials (including 1.5% sodium oleate). Other products sold under the name Igepon T are available which contain generally larger amounts of the taurate, and these may be used. However, they are considered less satisfactory. Igepon T–73 contains a particularly large amount of sodium chloride and for this reason it is preferably not used. However, when employing Igepon T products, an adjustment must be made in the amount of water in the product to take into account the amount of water in the Igepon T.

The monoether of a polyfunctional alcohol preferably has 3 to 6 carbon atoms and may be, e.g., the ethyl ether of ethylene glycol (Cellosolve), 2-methoxy-ethanol (Methyl Cellosolve), 2-butoxyethanol (Butyl Cellosolve) and diethylene glycol monoethyl ether (Carbitol). This increases flash point and surface tension, improves the foam density and high temperature stability.

In the preferred compositions, the materials are used in the following proportions, percentages being by weight.

| | Percent |
|---|---|
| Non-ionic surface active agent | .20 to 40 |
| Anionic surface active agent | 0.25 to 50 |
| Primary or secondary aliphatic alcohols | 0.02 to 10 |
| Polyfunctional alcohols | 0.25 to 50 |
| Monoethers of polyfunctional alcohols | 0.20 to 10 |
| Inorganic chromates | 0.01 to 1 |
| Water | 10 to 99 |

The above concentrations can be made by diluting a concentrate incorporating the above listed materials or can be made directly from each ingredient. Preferred proportions for this concentrate are about as follows:

| | Percent |
|---|---|
| Non-ionic surface active agent | 25.0–15 |
| Sodium-N-methyl-N-oleoyl taurate | about 1–2 |
| Primary or secondary aliphatic alcohol | 2.5–3 |
| Polyfunctional alcohols | 35.0–30 |
| Monoether of polyfunctional alcohol | 3.0–.04 |
| Inorganic chromates | 0.5–.05 |
| Water | 25–45 |

In selecting proportions, it is possible to vary somewhat the amounts of all constituents except the surface active agents. Thus, when using Igepon T–51 and Surfonic TD–90 it is desirable to use about twice as much of the TD–90 as the T–51. Significant departures from this ratio lead to "layering out" and other types of premature separation. Similarly, when other forms of these materials are used, it is quite important to stay within the above ranges. However, within the above, preferred proportions and materials are:

| | Percent |
|---|---|
| Non-ionic surface active agent | about 20 |
| Sodium-N-methyl-N-oleoyl taurate | 1–1.5 |
| Methyl alcohol | about 2.5–3 |
| Monoethyl ether of ethylene glycol | 2.5–3 |
| Ethylene glycol | 30–35 |
| Sodium chromate | 0.1–0.3 |
| Water | 30–40 |

The materials employed in the concentrate may be combined by any suitable means, but it has been found particularly desirable to heat the concentrate to an elevated temperature in the range 150° F.–250° F., preferably 170–190° F. Since this tends to homogenize the solution and minimize subsequent layering out. The following examples illustrate the practice of the invention. All percentages being by weight unless indicated otherwise.

EXAMPLE I

A concentrate was prepared containing the following materials, in parts by weight:

| | |
|---|---|
| Surfonic TD-90 | 19.71 |
| Methyl alcohol | 2.35 |
| Cellosolve | 2.78 |
| Water | 33.5 |
| Ethylene glycol | 32.77 |
| Sodium chromate | .14 |
| Igepon T-51 | 8.91 |

These materials may be compounded by making two solutions as follows:

Solution A

| | |
|---|---|
| TD-90 | 19.71 |
| Alcohol | 2.35 |
| Cellosolve | 2.78 |
| Water | 20.00 |
| Glycol | 32.77 |

Solution B

| | |
|---|---|
| Igepon | 8.91 |
| Water | 12.77 |
| Chromate | .14 |

Solution B can be prepared by gentle heating. The two solutions are mixed and heated up to 180° F. The mixture is then cooled. The heating helps to keep the material clear, whether in concentrate form or diluted in solution, whether frozen or later heated to 180° F.

This concentrate can be diluted with water to make solutions containing 1%, 2%, 3%, 6%, by weight etc. of the concentrate and such solutions can be used on appropriate classes of fires. For example, a 1% by weight solution of the concentrate can be used on Class A fires and as much as 3 to 6% by weight of concentrate can be used on Class B fires.

EXAMPLE II

A 1% solution of the concentrate of Example I was prepared and subjected to standard Underwriters' tests such as on a ball of ginned cotton, crib tests, penetrations, etc. and was found superior to conventional wet waters.

While it is not entirely clear how this composition operates, it is believed that this observed superiority is the result of the combination of the non-ionic and anionic surface active agents which incorporate in the liquids low surface tension, copious stable foam and stable colloidal solution at higher temperatures. The primary or secondary alcohol and monoether of polyfunctional alcohol reduce viscosity and may thermally decompose to carbon dioxide and water thus adding increased fire-extinguishing capacity.

Dilute solutions containing 1–3% of the concentrate such as that of Example I may be sold pre-made for example, in 5-gallon containers. These may be used in a hand pump or in 2½-gallon compressed air containers for plants, warehouses and the like. To prevent freezing, the water to which the concentrate is added may be diluted with ethylene glycol, e.g., in 50–50 mixture. For example, the formulation may be:

EXAMPLE III

| 1% solution, 5 gal. can | Ozs. |
|---|---|
| Concentrate of Example I | 6.40 |
| Ethylenne glycol | 316.80 |
| Water | 316.80 |
| 5 gals. or | 640.00 |
| Sodium chromate (by weight) | 1 |

EXAMPLE IV

| 3% solution, 5 gal. can | Ozs. |
|---|---|
| Concentrate of Example I | 19.20 |
| Ethylene glycol | 310.40 |
| Water | 310.40 |
| 5 gals. or | 640.00 |
| Sodium chromate (by weight) | 1 |

EXAMPLE V

Foams were produced with water containing 3% and 6% of the concentrate of Example I and were found superior to other wet water foams sold for Class B fires.

While preferred embodiments have been described, it will be appreciated that various changes and modifications may be made in the concentrate, its preparation and use without departing from the scope of the invention, as set forth in the claims.

The product herein described also is useful for increasing the penetration of pesticides into tree bark and the like, as described in Stewart application Serial No. 484,468, filed September 1, 1965.

What is claimed is:

1. A concentrate for use in aqueous fire fighting liquids consisting essentially of about 15–25% by weight of a non-ionic reaction product of ethylene oxide with tridecyl alcohol having a molecular weight of about 332 to about 860, about 1–2% by weight sodium N-methyl-N-oleoyl taurate, about 2.5–3% by weight of a member of the group consisting of water soluble primary and secondary saturated unsubstituted aliphatic alcohols having up to 4 carbon atoms, about 30%–35% of a water soluble polyhydric alcohol selected from the group consisting of ethylene glycol, propylene glycol, butylene glycol, trimethylene glycol, tetramethylene glycol and diethylene glycol, up to about 3% of a monoether of a polyhydric alcohol having 3 to 6 carbon atoms selected glycol, 2-methoxyethanol, 2-butoxyethanol and diethylene glycol, monoethyl ether, about 0.05% to about 0.5% of an alkali metal chromate and about 25–45% water.

2. An aqueous fire fighting liquid consisting essentially of water containing about 1–6% of the concentrate of claim 1.

3. A concentrate for use in aqueous fire fighting liquids consisting essentially of about 20% by weight of a non-ionic reaction product of ethylene oxide with tridecyl alcohol having a molecular weight of about 596, about 1–1.5% by weight of sodium-N-methyl-N-oleoyl taurate, about 2.5–3% by weight methyl alcohol, about 2.5–3% of monoethyl ether of ethylene glycol, about 30–35% ethylene glycol, about 0.1 to 0.3% sodium chromate, and about 30–40% water.

References Cited

UNITED STATES PATENTS

| | | | |
|---|---|---|---|
| 2,088,085 | 7/1937 | Gross et al. | 252—307 |
| 2,165,997 | 7/1939 | Daimler et al. | 252—3 |
| 2,196,042 | 4/1940 | Timpson | 252—307 XR |
| 2,413,667 | 12/1946 | Urguhart | 252—307 |
| 2,433,625 | 12/1947 | Raspit | 252—307 |
| 2,934,568 | 4/1960 | Barker | 252—89 XR |
| 2,965,678 | 12/1960 | Sundberg et al. | 252—89 XR |

FOREIGN PATENTS 153,569  10/1953  Australia.

OTHER REFERENCES

"Surfonic" Technical Bulletin, Jefferson Chemical Company, 1958, pp. 9, 14, 23 and 30.

"Igepon Surfactants" Antara Chemicals N.Y. 1958, pp. 2–5.

MAYER WEINBLATT, Primary Examiner

U.S. Cl. X.R.

252—6.5, 8.05, 152, 307